United States Patent Office 3,483,032
Patented Dec. 9, 1969

3,483,032
METHOD OF DRYING SUGAR-CONTAINING MATERIALS
Robert M. Stern, Milwaukee, Wis., and Arnold B. Storrs, Solon, Ill., assignors to Great Lakes Biochemical Co., Inc., Milwaukee, Wis., a corporation of Wisconsin
No Drawing. Filed Oct. 23, 1965, Ser. No. 504,228
Int. Cl. C13f 1/02
U.S. Cl. 127—58    2 Claims

ABSTRACT OF THE DISCLOSURE

A method of processing fruit juices such as apple and grape juice and syrups such as honey comprising the steps of adding a corn syrup solid having a dextrose equivalent of 45 or below, or lactose to the juice. The amount of material to be added comprises at least 75% of the levulose in the fruit juice. The final step is to freeze-dry the material thus compounded.

---

This invention relates to an improved method for drying sugar-containing materials such as fruit juices, syrups, and similar materials.

Certain fruit juices and syrups, such as apple juice, grape juice, honey, are difficult, if not impossible, to dry by usual methods. The difficulty seems to arise from their relatively high content of monosaccharides, notably levulose, which is highly soluble and highly hygroscopic. High temperatures cannot be employed without losing characteristic flavor. At low temperature the hygroscopicity of the sugars involved, together with their tendency to form viscous syrups, results in prolonging the time required for drying beyond practical limits.

When a fruit juice, such as apple, is dried at low temperature, either by freeze-drying or vacuum drying, there is no great problem in removing water by evaporation or sublimation during the early stages of the process. However, when the concentration has reached the syrupy stage, the material becomes difficult or impossible to handle; it bubbles and foams, or loses its initial structure and collapses. While the juice can be dried with a prolonged process from this condition, the end product inevitably reaches the "glassy" state which can be collected only with difficulty and requires further processing before being usable.

Some fruit juices have been dried successfully by vacuum or foam-mat drying, or freeze-drying. However, grape juice can be dried only with difficulty and apple juice with no practical success at all without modification. Experience has shown that those materials such as apple juice and grape juice in which levulose comprises more than 25% of the total sugar solids, or those in which invert sugar or dextrose comprises more than 50%, give unsatisfactory yields.

Levulose is the most hygroscopic and soluble of the sugars. As such, it tends readily to inhibit or destroy the formation of a stable foam structure or matrix which is apparently essential for the production of a friable, easily soluble dry product. The establishment and maintenance of such a foam structure or matrix is highly beneficial because it provides increased surfaces for evaporation or sublimation of the water and greatly speeds the drying process.

Dextrose is neither as soluble nor as hygroscopic as levulose and consequently is not as active an antagonist in the preservation of the matrix. However, it does not contribute to the matrix strength and therefore must be considered as at least a passive antagonist.

The principal object of this invention therefore is to provide an improved method of drying materials such as apple juice and grape juice wherein a dry, friable concentrate is produced by easily performed steps without loss of characteristic flavor and without a prolonged period of drying.

The objects of this invention are attained by a method wherein the materials to be processed are prepared in a unique manner prior to drying. Such preparation involves the use of proper additives which are mixed with the material to be dried to supply and support the formation of a stable foam or matrix structure, and consequently can be used to improve drying characteristics of the difficult juices.

In order to properly describe the method of this invention it will first be necessary to define the nature of the additive employed. The term "higher carbohydrates" will be used to include any disaccharide as well as higher molecular weight sugars and soluble carbohydrate derivatives of starch hydrolysis. The principal common examples of the group are lactose and corn syrup solids having a relatively low dextrose equivalent.

Lactose is the most desirable of the disaccharides when used as a drying adjunct. Its low solubility promotes crystallization as the drying progresses thus forming adsorptive centers for volatile components as well as contributing rigidity to matrix structure. Its relatively low level of sweetness does not materially change the flavor of the product to which it is added.

The most practical source of other suitable carbohydrates as drying adjuncts is from starch derivatives such as corn syrup, or corn syrup solids. These are mixtures of dextrins, polysaccharides, disaccharides and monosaccharides, the proportions depending upon the degree of processing or conversion. Those processed to a low degree of conversion are best suited for this purpose since they contain the least amounts of monosaccharide or dextrose. High conversion corn syrups, which may contain 45% or more of dextrose, are not very suitable. The higher molecular weight components are the desirable fractions since they are less soluble and thus provide the skeleton or framework which will support a stable foam or matrix structure.

Fruit juices, syrups or honeys which are difficult or impossible to dry by conventional methods contain a preponderance of monosaccharides, i.e., levulose and/or dextrose. At the same time, they are deficient in the higher carbohydrates which would permit or promote the formation of a stable foam structure or matrix essential for an efficient drying process. This invention provides a means for correcting this deficiency, thus making a satisfactory drying process practical.

In practice, an appropriate amount of the "higher carbohydrates" is added to the juice or material to be dried, mixed and dissolved as completely as possible, after which drying is carried out in the usual manner. Freeze-drying is the preferable manner in most cases, although vacuum drying without prior freezing may be satisfactory in those cases where the material is sufficiently concentrated to permit handling in this manner.

To determine the amount of additive required, the proximate composition of the sugars in the material to be dried must be known. The amount of higher carbohydrates to be added depends upon the amount and ratio of the monosaccharides in the original juice. Higher carbohydrates must be added so that this fraction, including any which may have been in the juice itself, will comprise at least 75% of the levulose or at least 25% of the total monosaccharide content, whichever is higher. This is the minimum amount which can be expected to be beneficial. Best results will be obtained if the higher carbohydrates in the treated juice are adjusted to about 125% of the levulose content or about 75% of the total monosaccharide content, whichever is higher.

There is no practical maximum limitation on the amount of higher carbohydrates which may be added, since materials can be dried quite satisfactorily in the presence of a gross excess of these additives. In practical use, the maximum amount to be employed will be determined more by the use for which the end-product is intended than by limitations of the process itself.

While both lactose and corn syrup solids provide a suitable foam structure or matrix for the drying juice, they differ a little in their performance. Lactose, by its nature, tends to impart a more crystalline structure to the foam as it dries and, if used in relatively large amounts, will even restrict foam volume, yielding a rather hard, crystalline end-product. Corn syrup solids tend toward a more amorphous type foam, being increasingly so as the amount of dextrose increases, and exerting less of a limiting effect than lactose.

It is not essential that a single form of carbohydrate additive be used. They can be mixed as desired, sometimes thus aiding in achieving the type of foam structure most suitable for the product.

Having thus described this invention in a general way, the following are specific examples of actual tests made with various materials employing the teachings of this invention. In making the tests outlined below, the drying technique employed was the so-called "freeze drying" process which, as indicated above, is the preferred drying technique used in the practice of this invention. The freeze drying process is well known and involves the sublimation of moisture in the frozen state in the material under conditions of high vacuum. The latent heat of sublimation is customarily applied by conduction from platens, which are heated during the course of the drying. In the specific examples outlined below, the material to be dried was frozen by reducing its temperature to about 10° F. or below. The frozen material was placed on a platen in a vacuum chamber. The pressure was then reduced to at least 2 mm. mercury or less and then heat was applied by the platen.

Apple juice

As indicated previously, untreated apple juice can be dried by freeze-drying only with the greatest difficulty, if at all. It requires a long drying cycle and invariably dries only to the "glassy" state, which cannot be collected or harvested efficiently. While the end-product is soluble, it lacks the "instant" properties which are desired.

The following series of samples, using fresh, unconcentrated apple juice, demonstrate the favorable results which can be obtained by the use of "high carbohydrate" additives. In this series the drying equipment was operated at a platen temperature of 200° F. for the first 3¼ hours after the initial pull-down to operating vacuum, followed by 2½ hours at a platen temperature of 125° F. Total cycle time was 6 hours.

Control sample (no additive): did not dry completely; did not exhibit any puff or foam structure; was "glassy" with plastic, tacky body at end of cycle.

2% lactose: had very slight foam structure; was tacky and not completely dry.

4% lactose: slight foam structure; very slightly tacky; not quite completely dry.

8% lactose: dry; good foam structure; light, friable body.

16% lactose: dry; high foam structure; light, friable body.

2% corn syrup solids (24 DE): very slight foam; slightly tacky; not completely dry.

4% corn syrup solids (24 DE): slight foam; very slightly tacky; not quite completely dry.

8% corn syrup solids (24 DE): dry; good foam structure; light friable body.

16% corn syrup solids (24 DE): dry; good foam structure; light, friable body.

All of the above samples were soluble when reconstituted with water, but those containing 8% and 16% added carbohydrates were more rapidly dissolved than those at lower levels.

Inasmuch as fresh apple juice contains approximately 6.6% levulose and about 1.6% dextrose, it will be seen that optimum results were achieved when the carbohydrate additive amounted to at least 120% of the levulose content, or at least 95% of the total monosaccharide content.

It will also be observed that the added carbohydrates shortened the time required for drying the juice, a matter of some economic importance.

Honey

Honey is essentially a natural form of invert sugar, containing about 70–75% sugar as a mixture of levulose and dextrose, with the levulose comprising usually more than half of the total sugar. With such composition, it would be expected that drying would present difficulties, and it is indeed the case. Untreated honey foams excessively during freeze-drying to the point of being impractical, but in any case collapses to the glassy state by the time the process approaches completion.

The addition of 80% lactose to the original honey aided in controlling foaming during drying, while 120% suppressed it almost entirely. In the latter case, the end-product had a hard, crystalline structure but considerably more open than the so-called glassy state.

Low DE corn syrup solids, in this case Malto-Dextrin, gave good foam control at the 80% level and a good end-product.

High DE corn syrup, 63 DE, containing about 40% dextrose, caused excessively wild foaming during drying at either 40% or 120% levels, although such of the end-product as could be recovered was dry and friable.

Grape juice

The sugars of grape juice are monosaccharides, fresh juice containing about 8% levulose and 14% dextrose. As might be expected, this composition indicates that problems will be encountered in drying due to a lack of foam-forming or structural elements.

The addition of 20% lactose to grape juice gave very good results with respect to drying. As little as 4% lactose improved drying performance but not sufficiently to be of practical significance. Additions greater than 20% did not appear to have any increased advantages.

Malto-Dextrin, a low DE corn syrup product, had about the same effect as lactose except that about half again as much was required for the same degree of improvement.

High conversion corn syrup, as typified by a material with a 63 DE value, resulted in excessive foaming and poor results. These high conversion syrups contain too much dextrose to be able to supply enough foam structural elements in a system such as that of grape juice.

Grape juice is a typical example of the case where the total content of monosaccharides would be the determining factor in selecting the amount of higher carbohydrates to add.

Although several embodiments of the present invention have been illustrated and described, it will be apparent to those skilled in the art that various changes and modifications may be made therein without departing from the spirit of the invention or from the scope of the appended claims.

We claim:

1. The method of processing fruit juices such as apple and grape juice in which the levulose comprises more than 25% of the total sugar solids comprising the steps of:

adding lactose to the material to be processed, the amount of lactose to be added comprising at least 75% by weight of the levulose or at least 25% by weight of the total monosaccharide content of the material whichever is higher; and freeze-drying the matreial thus compounded.

2. The method of processing fruit juices such as apple and grape juice in which the levulose comprises more than 25% of the total sugar solids comprising the steps of:

adding a corn syrup solid having a dextrose equivalent of 45 or below to the material to be processed, the amount of such dextrose equivalent to be added comprising at least 75% by weight of the levulose or at least 25% by weight of the total monosaccharide content of the material, whichever is higher; and freezing-drying the material thus compounded.

References Cited

UNITED STATES PATENTS

| | | | |
|---|---|---|---|
| 1,686,670 | 10/1928 | Leo. | |
| 2,147,238 | 2/1939 | Bruce | 99—205 X |
| 2,223,925 | 12/1940 | Walsh | 127—30 |
| 2,373,919 | 4/1945 | Schweiger | 127—30 |
| 2,492,505 | 12/1949 | Steffens | 99—205 |
| 2,559,204 | 7/1951 | Wenzelberger | 99—205 X |
| 2,818,356 | 12/1957 | Shookhoff | 127—29 X |
| 3,269,025 | 8/1966 | Dryden | 99—204 X |
| 3,278,309 | 10/1966 | Heap et al. | 99—205 X |

MORRIS O. WOLK, Primary Examiner

D. G. CONLIN, Assistant Examiner

U.S. Cl. X.R.

99—205; 127—29, 60, 61